US012602740B2

(12) United States Patent
Jnawali et al.

(10) Patent No.:  US 12,602,740 B2
(45) Date of Patent:  Apr. 14, 2026

(54) UNSUPERVISED LEARNING-BASED SCALE-INDEPENDENT BLUR KERNEL ESTIMATION FOR SUPER-RESOLUTION

(71) Applicant: SAMSUNG ELECTRONICS CO., LTD., Suwon-si (KR)

(72) Inventors: Kamal Jnawali, Tustin, CA (US); Tien Cheng Bau, Irvine, CA (US)

(73) Assignee: Samsung Electronics Co. Ltd., Suwon-si (KR)

( * ) Notice: Subject to any disclaimer, the term of this patent is extended or adjusted under 35 U.S.C. 154(b) by 591 days.

(21) Appl. No.: 17/813,551

(22) Filed: Jul. 19, 2022

(65) Prior Publication Data

US 2023/0041888 A1      Feb. 9, 2023

Related U.S. Application Data

(60) Provisional application No. 63/229,030, filed on Aug. 3, 2021.

(51) Int. Cl.
  *G06T 3/4053*     (2024.01)
  *G06T 3/4046*     (2024.01)
  *G06T 5/70*      (2024.01)

(52) U.S. Cl.
  CPC .......... *G06T 3/4053* (2013.01); *G06T 3/4046* (2013.01); *G06T 5/70* (2024.01)

(58) Field of Classification Search
  CPC ........ G06T 3/4053; G06T 5/70; G06T 3/4046
  See application file for complete search history.

(56) References Cited

U.S. PATENT DOCUMENTS

| | | | | |
|---|---|---|---|---|
| 9,692,939 | B2 * | 6/2017 | Irani | .................... H04N 1/4092 |
| 11,024,013 | B2 | 6/2021 | Halupka et al. | |
| 2018/0075581 | A1 * | 3/2018 | Shi | ......................... G06N 3/045 |
| 2018/0197278 | A1 | 7/2018 | Lee et al. | |
| 2019/0244331 | A1 | 8/2019 | Gu et al. | |
| 2021/0192251 | A1 | 6/2021 | Sang et al. | |
| 2021/0210054 | A1 | 7/2021 | Baijal | |
| 2021/0233210 | A1 | 7/2021 | Elron et al. | |

FOREIGN PATENT DOCUMENTS

WO      2021-111326 A1      6/2021

OTHER PUBLICATIONS

R. Zhou and S. Süsstrunk, "Kernel Modeling Super-Resolution on Real Low-Resolution Images", 2024, IEEE, ICCV, 2433-2443 (Year: 2019).*

(Continued)

*Primary Examiner* — Gregory A Morse
*Assistant Examiner* — Rohan Tejas Mukundhan
(74) *Attorney, Agent, or Firm* — Sherman IP LLP; Kenneth L. Sherman; Steven Laut

(57)         ABSTRACT

One embodiment provides a method generating a first image crop and a second image crop randomly extracted from a low-quality image and a high-quality image, respectively. The method further comprises comparing the first image crop and the second image crop using a plurality of loss functions including pixel-wise loss to calculate losses, and optimizing a model trained to estimate a realistic scale-independent blur kernel of a low-resolution (LR) blurred image by minimizing the losses.

20 Claims, 12 Drawing Sheets
(5 of 12 Drawing Sheet(s) Filed in Color)

(56) References Cited

OTHER PUBLICATIONS

Bell-Kligler, S., Shocher, A., & Irani, M. (2019). Blind super-resolution kernel estimation using an internal-gan. Advances in neural information processing systems, 32. (Year: 2019).*

Zhou, R., & Susstrunk, S. (2019). Kernel modeling super-resolution on real low-resolution images. In Proceedings of the IEEE/CVF International Conference on Computer Vision (pp. 2433-2443). (Year: 2019).*

Maeda, S. (2020). Unpaired image super-resolution using pseudo-supervision. In Proceedings of the IEEE/CVF conference on computer vision and pattern recognition (pp. 291-300). (Year: 2020).*

Wang, X., et al. "ESRGAN: Enhanced super-resolution generative adversarial networks." Proceedings of the European Conference on Computer Vision (ECCV) Workshops, 2018, pp. 1-16, United States.

Zhang, K., et al. "Deep plug-and-play super-resolution for arbitrary blur kernels." Proceedings of the IEEE/CVF Conference on Computer Vision and Pattern Recognition, 2019, pp. 1671-1681, United States.

Ji, X., et al. "Real-world super-resolution via kernel estimation and noise injection." Proceedings of the IEEE/CVF Conference on Computer Vision and Pattern Recognition Workshops, 2020, pp. 1-10, United States.

Bell-Kligler, S., et al., "Blind Super-Resolution Kernel Estimation using an Internal-GAN." Advances in Neural Information Processing Systems 32, 2019, p. 284-293, Canada.

Extended European Search Report dated Jun. 4, 2024 for EP Patent Application No. 22853449.1, from European Patent Office, pp. 1-6, Munich, Germany.

Kim, S., et al., "KOALAnet: Blind Super-Resolution using Kernel Oriented Adaptive Local Adjustment", arxiv.org, Cornell University Library, Dec. 15, 2020, pp. 1-17, Ithaca, New York.

Xu, X., et al., "Learning to Super-Resolve Blurry Face and Text Images", 2017 IEEE International Conference on Computer Vision (ICCV), Oct. 22, 2017, pp. 251-260, IEEE, United States.

Chen, H., et al., "Real-World Single Image Super-Resolution: A Brief Review", arxiv.org, Cornell University Library, Mar. 3, 2021, pp. 1-18, Ithaca, New York.

European Examination Report dated Jan. 29, 2025 for EP Patent Application No. 22853449.1, from European Patent Office, pp. 1-5, Munich, Germany.

International Search Report and Written Opinion dated Nov. 18, 2022 for International Application PCT/KR2022/011455, from Korean Intellectual Property Office, pp. 1-6, Republic of Korea.

* cited by examiner

100

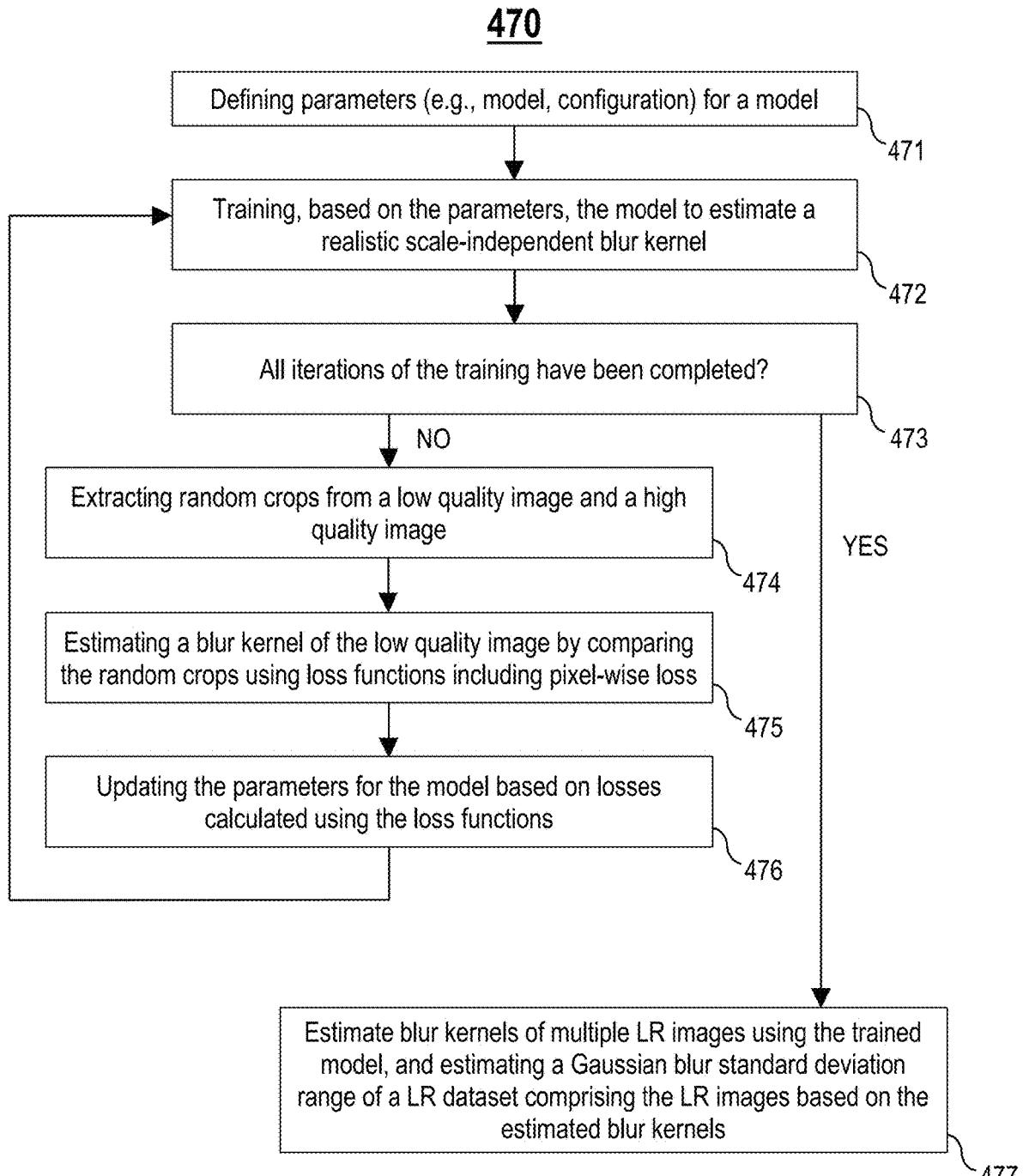

470

Defining parameters (e.g., model, configuration) for a model
471

Training, based on the parameters, the model to estimate a realistic scale-independent blur kernel
472

All iterations of the training have been completed?
473

NO

Extracting random crops from a low quality image and a high quality image
474

Estimating a blur kernel of the low quality image by comparing the random crops using loss functions including pixel-wise loss
475

Updating the parameters for the model based on losses calculated using the loss functions
476

YES

Estimate blur kernels of multiple LR images using the trained model, and estimating a Gaussian blur standard deviation range of a LR dataset comprising the LR images based on the estimated blur kernels
477

FIG. 2B

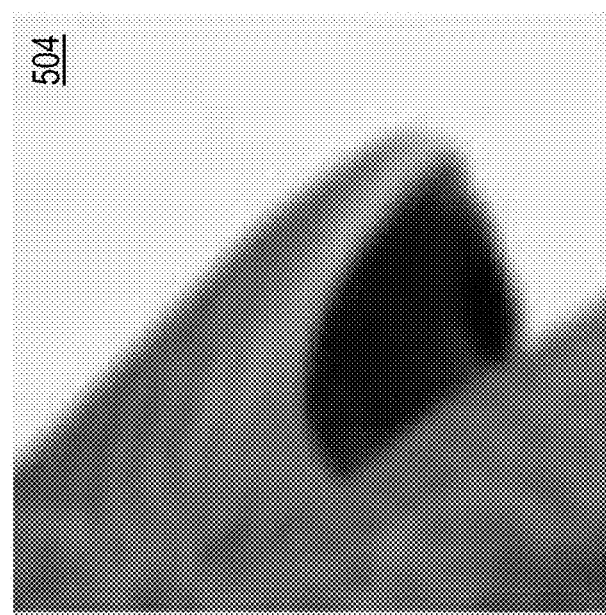
Blurred Target Image Crop
504
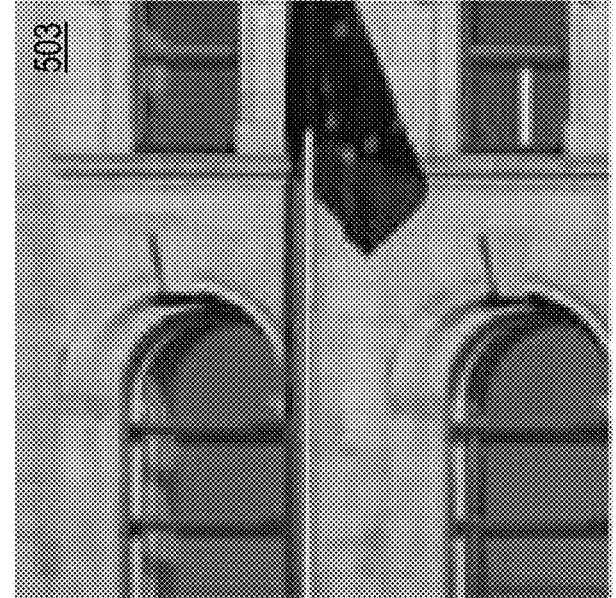
Blur-Free Source Image Crop
503
FIG. 5

Blurred Output Image
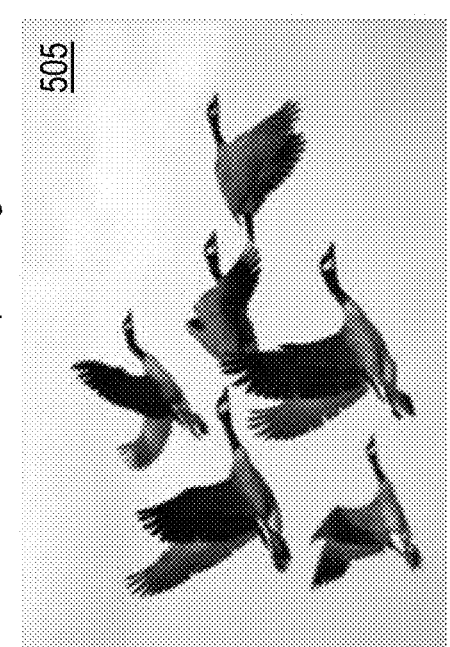
505
Blurred Target Image
502
FIG. 6A

Blurred Output Image
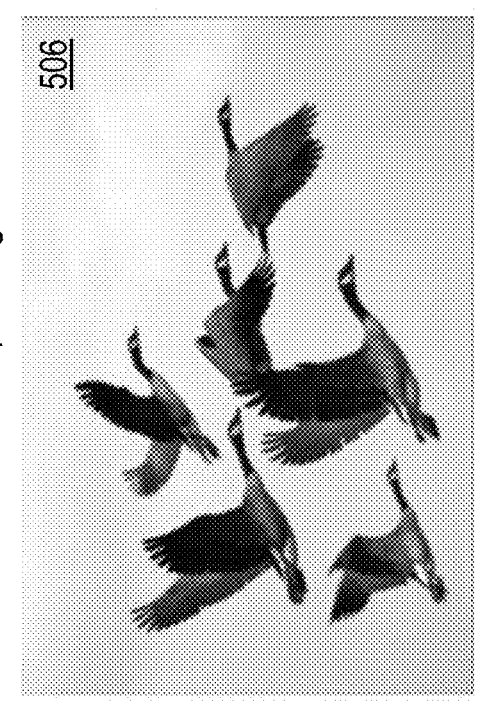
506
Blurred Target Image
502
FIG. 6B

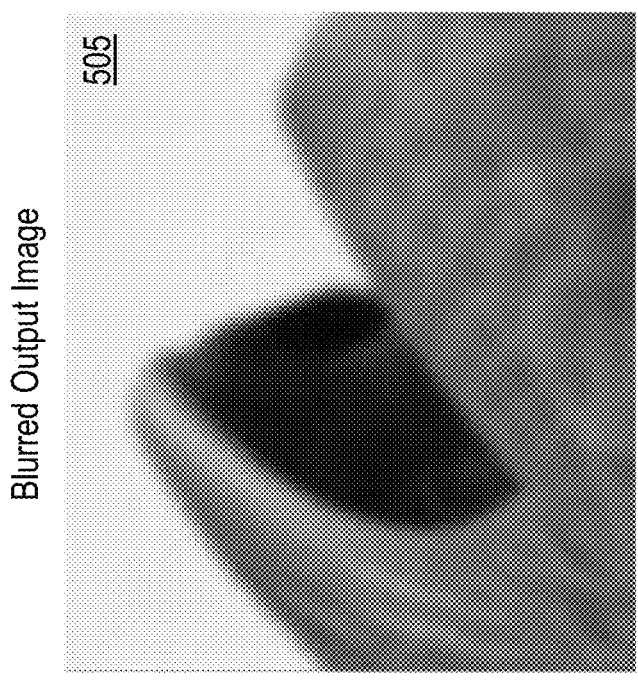
Blurred Output Image
505
Blurred Target Image Crop
504
FIG. 7

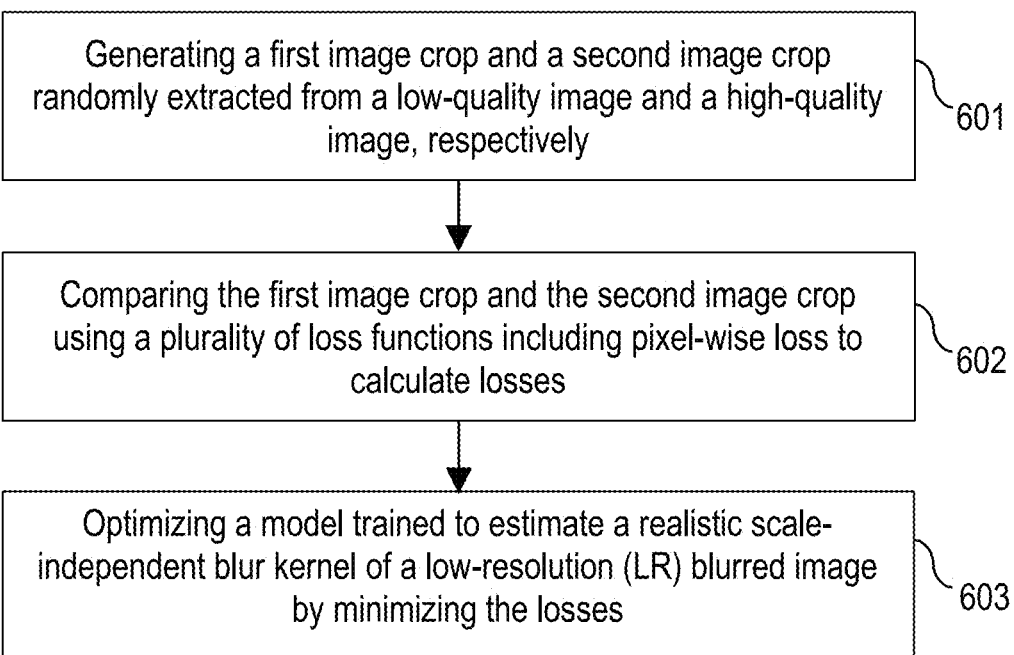

<u>600</u>

Generating a first image crop and a second image crop randomly extracted from a low-quality image and a high-quality image, respectively ⟋601

Comparing the first image crop and the second image crop using a plurality of loss functions including pixel-wise loss to calculate losses ⟋602

Optimizing a model trained to estimate a realistic scale-independent blur kernel of a low-resolution (LR) blurred image by minimizing the losses ⟋603

FIG. 9

UNSUPERVISED LEARNING-BASED SCALE-INDEPENDENT BLUR KERNEL ESTIMATION FOR SUPER-RESOLUTION

CROSS-REFERENCE TO RELATED APPLICATIONS

The present application claims priority to U.S. Provisional Patent Application No. 63/229,030, filed on Aug. 3, 2021, incorporated by reference in its entirety.

TECHNICAL FIELD

One or more embodiments generally relate to deep convolutional super-resolution (SR) neural networks, in particular, unsupervised learning-based scale-independent blur kernel estimation.

BACKGROUND

Deep convolutional SR neural networks are used to learn the mapping of low-resolution images to high-resolution images.

SUMMARY

One embodiment provides a method generating a first image crop and a second image crop randomly extracted from a low-quality image and a high-quality image, respectively. The method further comprises comparing the first image crop and the second image crop using a plurality of loss functions including pixel-wise loss to calculate losses, and optimizing a model trained to estimate a realistic scale-independent blur kernel of a low-resolution (LR) blurred image by minimizing the losses.

Another embodiment provides a system comprising at least one processor and a non-transitory processor-readable memory device storing instructions that when executed by the at least one processor causes the at least one processor to perform operations. The operations include generating a first image crop and a second image crop randomly extracted from a low-quality image and a high-quality image, respectively, comparing the first image crop and the second image crop using a plurality of loss functions including pixel-wise loss to calculate losses, and optimizing a model trained to estimate a realistic scale-independent blur kernel of a LR blurred image by minimizing the losses.

One embodiment provides a non-transitory processor-readable medium that includes a program that when executed by a processor performs a method. The method comprises generating a first image crop and a second image crop randomly extracted from a low-quality image and a high-quality image, respectively. The method further comprises comparing the first image crop and the second image crop using a plurality of loss functions including pixel-wise loss to calculate losses, and optimizing a model trained to estimate a realistic scale-independent blur kernel of a LR blurred image by minimizing the losses.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which:

FIG. 2B is a flowchart of an example process implemented by the system of FIG. 2A for realistic scale-independent blur kernel estimation, in one or more embodiments;

FIG. 5 illustrates different image crops used during the training of the realistic scale-independent blur kernel GAN-based deep neural network, in one or more embodiments;

FIG. 6A illustrates a visual comparison between a blurred target image and a blurred output image generated by the realistic scale-independent blur kernel GAN-based deep neural network, in one or more embodiments;

FIG. 6B illustrates a visual comparison between a blurred target image and a blurred output image generated by a conventional GAN-based architecture;

FIG. 7 illustrates a visual comparison between a blurred target image crop randomly extracted from a blurred target image and a blurred output image generated by the realistic scale-independent blur kernel GAN-based deep neural network, in one or more embodiments;

FIG. 9 is a flowchart of an example process for realistic, scale-independent blur kernel estimation, in one or more embodiments.

DETAILED DESCRIPTION

Figure 1:
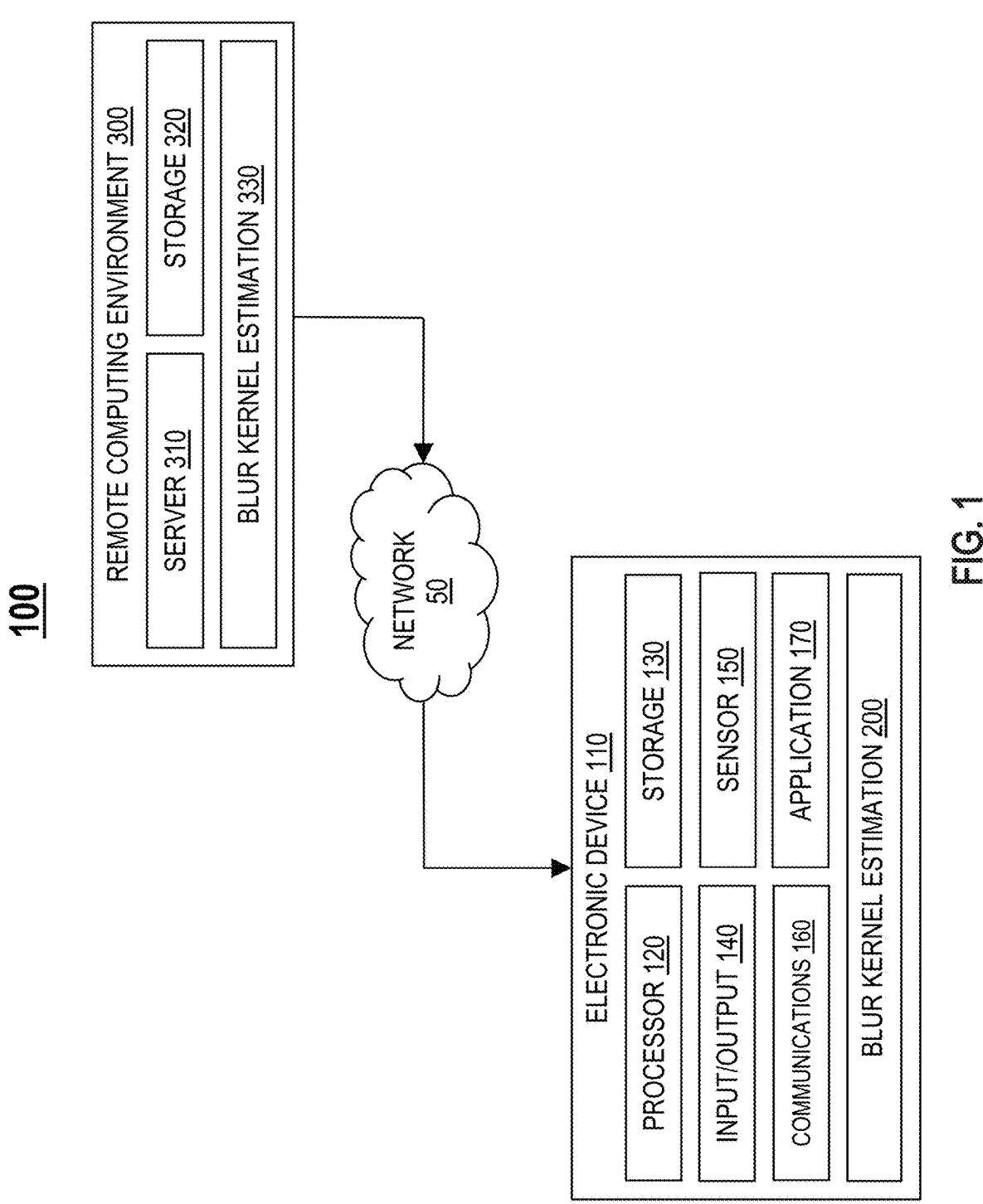
FIG. 1 illustrates an example computing architecture for implementing realistic scale-independent blur kernel estimation, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to super-resolution networks, in particular, unsupervised learning-based scale-independent blur kernel estimation. One embodiment provides a method generating a first image crop and a second image crop randomly extracted from a low-quality image and a high-quality image, respectively. The method further comprises comparing the first image crop and the second image crop using a plurality of loss functions including pixel-wise loss to calculate losses, and optimizing a model trained to estimate a realistic scale-independent blur kernel of a low-resolution (LR) blurred image by minimizing the losses.

Another embodiment provides a system comprising at least one processor and a non-transitory processor-readable memory device storing instructions that when executed by the at least one processor causes the at least one processor to perform operations. The operations include generating a first image crop and a second image crop randomly extracted from a low-quality image and a high-quality image, respectively, comparing the first image crop and the second image crop using a plurality of loss functions including pixel-wise loss to calculate losses, and optimizing a model trained to estimate a realistic scale-independent blur kernel of a LR blurred image by minimizing the losses.

One embodiment provides a non-transitory processor-readable medium that includes a program that when executed by a processor performs a method. The method comprises generating a first image crop and a second image crop randomly extracted from a low-quality image and a high-quality image, respectively. The method further comprises comparing the first image crop and the second image crop using a plurality of loss functions including pixel-wise loss to calculate losses, and optimizing a model trained to estimate a realistic scale-independent blur kernel of a LR blurred image by minimizing the losses.

Conventional deep learning-based super-resolution (SR) models, such as deep learning-based single image SR models, are typically designed for pre-defined blur kernel-based bicubic degradation (estimated using a bicubic mean squared error (MSE) loss function that is scale-dependent). Blur kernels in real-world applications, however, are complex, unknown, and significantly deteriorate performance of such SR models. An unknown blur kernel is categorized as a blind SR problem. Some existing deep learning-based blind SR models generate an image-specific blur kernel but cannot generate a realistic low-resolution image.

Let $I_{LR}$ generally denote a LR image, let $I_{HR}$ generally denote a high-resolution (HR) image, let s generally denote a scaling factor, and let k generally denote a blur kernel. A basic SR model assumes that a LR image $I_{LR}$ results from downscaling a HR image $I_{HR}$ by a scaling factor s using a blur kernel k in accordance with the equation (1) provided below:

$$I_{LR} = (I_{HR} * k) \downarrow_s \qquad (1).$$

Examples of LR images include, but are not limited to, Standard Definition (SD) images, etc. Examples of HR images include, but are not limited to, High Definition (HD) images, 4K images (i.e., four times more pixels than HD), 8K images, etc.

Most SR models assume that a down-sampled blur kernel is known in advance and pre-defined. A degradation model based on blur kernels involved in real-world applications, however, is complex and unavailable. Conventionally, SR models are trained on synthetically generated LR images that are obtained using bicubic blur kernels (estimated using a bicubic MSE loss function that is scale-dependent), resulting in trained SR models with deteriorating performance.

One or more embodiments provides a fully unsupervised Generative Adversarial Network (GAN)-based deep neural network to generate a scale-independent blur kernel to enhance the performance of SR models. One or more embodiments allows for selection of a blur kernel suitable for SR and for significantly improving performance of SR models.

One or more embodiments provide a method and system for estimating a realistic scale-independent blur kernel that is capable of generating realistic LR images to counterpart HR images. In one embodiment, a range of standard deviation for Gaussian blur ("Gaussian blur standard deviation range") of available LR images is generated based on the scale-independent blur kernel. The Gaussian blur standard deviation range is used to generate one or more LR-HR training pairs. Each of the one or more LR-HR training pairs comprises a LR image (e.g., a SD image) and a corresponding HR image (e.g., a 4K image). Each LR image of the one or more LR-HR training pairs is generated from a same single HR image with a standard deviation randomly selected from the Gaussian blur standard deviation range.

FIG. 1 illustrates an example computing architecture 100 for implementing realistic scale-independent blur kernel estimation, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a blur kernel estimation system 200 configured to provide on-device processing including realistic, scale-independent blur kernel estimation. As described in detail later herein, the blur kernel estimation system 200 is configured to: (1) generate a model for estimating blur of an image, (2) generate a range of standard deviation for Gaussian blur ("Gaussian blur standard deviation range"), and (3) generate, based on the Gaussian blur standard deviation range, one or more training samples for a SR neural network. Unlike conventional solutions that require use of an image to estimate blur of the image and generate training samples for a SR neural network, the blur kernel estimation system 200 is able to estimate the blur of the image and generate training samples for a SR neural network without using the image itself.

Examples of an electronic device 110 include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, the electronic device 110 comprises one or more sensor units 150 integrated in or coupled to the electronic device 110. In one embodiment, the one or more sensor units 150 include, but not limited to, a camera, a microphone, a GPS, a motion sensor, etc.

In one embodiment, the electronic device 110 comprises one or more input/output (I/O) units 140 integrated in or coupled to the electronic device 110. In one embodiment, the one or more I/O units 140 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 140 to configure one or more parameters (e.g., pre-defined thresholds), provide user input, etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 200.

In one embodiment, the electronic device 110 comprises a communications unit 160 configured to exchange data with a remote computing environment 300 (e.g., receiving an image from the remote computing environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 300 includes resources, such as one or more servers 310 and one or more storage units 320. One or more applications that provide higher-level services may execute/operate on the remote computing environment 300 utilizing the resources of the remote computing environment 300. In one embodiment, the one or more applications on the remote computing environment 300 include a blur kernel estimation system 330 configured to provide off-device processing.

In one embodiment, the remote computing environment 300 provides an online platform for hosting one or more online services (e.g., a video streaming service, etc.) and/or distributing one or more software mobile applications 170. As another example, the system 200 may be loaded onto or downloaded to the electronic device 110 from a remote computing environment 300 that maintains and distributes updates for the system 200. As yet another example, a remote computing environment 300 may comprise a cloud computing environment providing shared pools of configurable computing system resources and higher-level services.

Figure 2A:
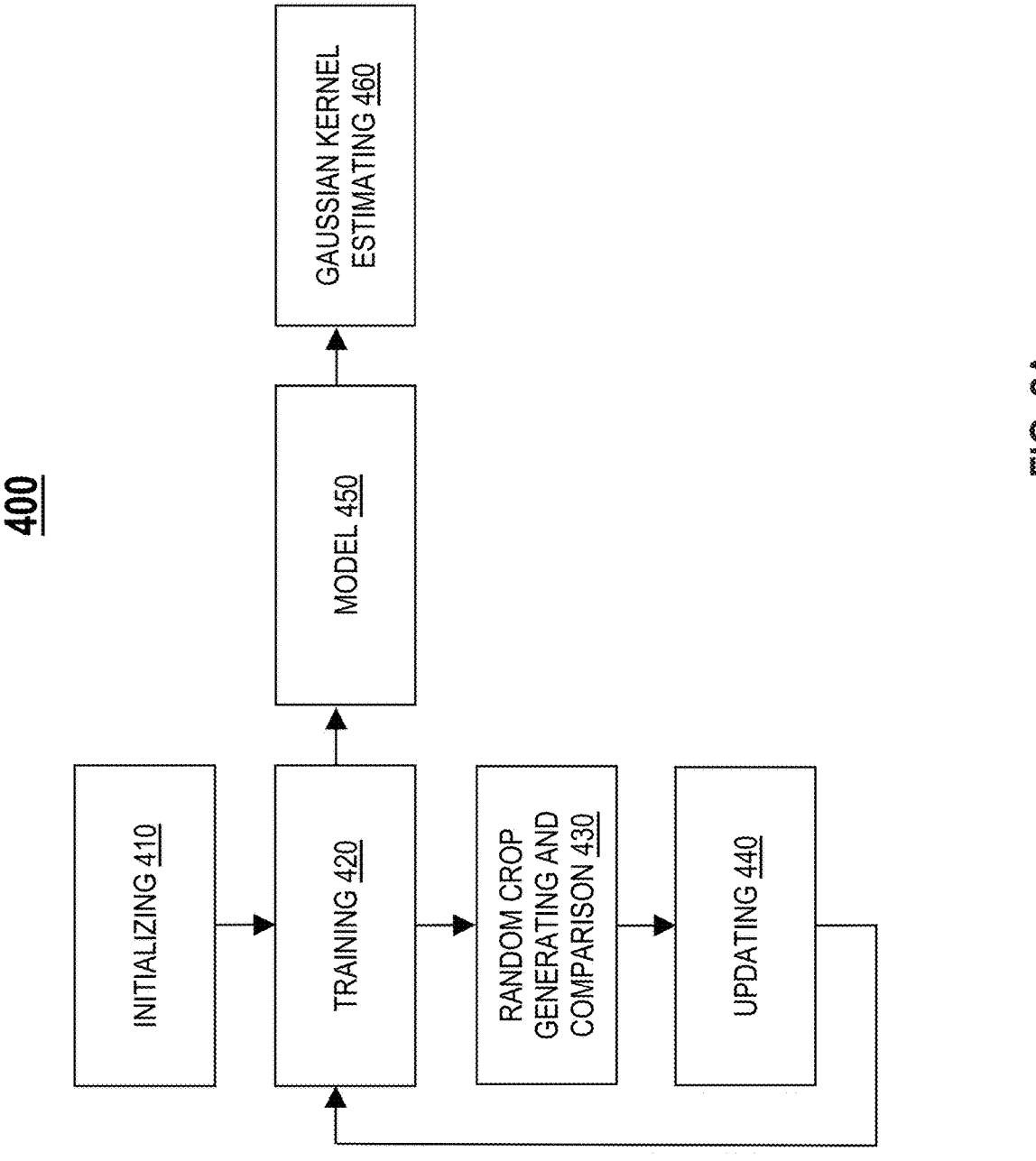
FIG. 2A illustrates an example system for implementing realistic, scale-independent blur kernel estimation, in one or more embodiments.

FIG. 2A illustrates an example system 400 for implementing realistic, scale-independent blur kernel estimation, in one or more embodiments. In one embodiment, one or more components of the system 400 is integrated into, or implemented as part of, the system 200 in FIG. 1.

In one embodiment, the system 400 comprises an initializing unit 410 configured to define a set of parameters corresponding to a model 450. The set of parameters include, but are not limited to, at least one model parameter, at least one configuration parameter, etc. The initializing unit 410 provides initial values of the set of parameters.

Figure 4:
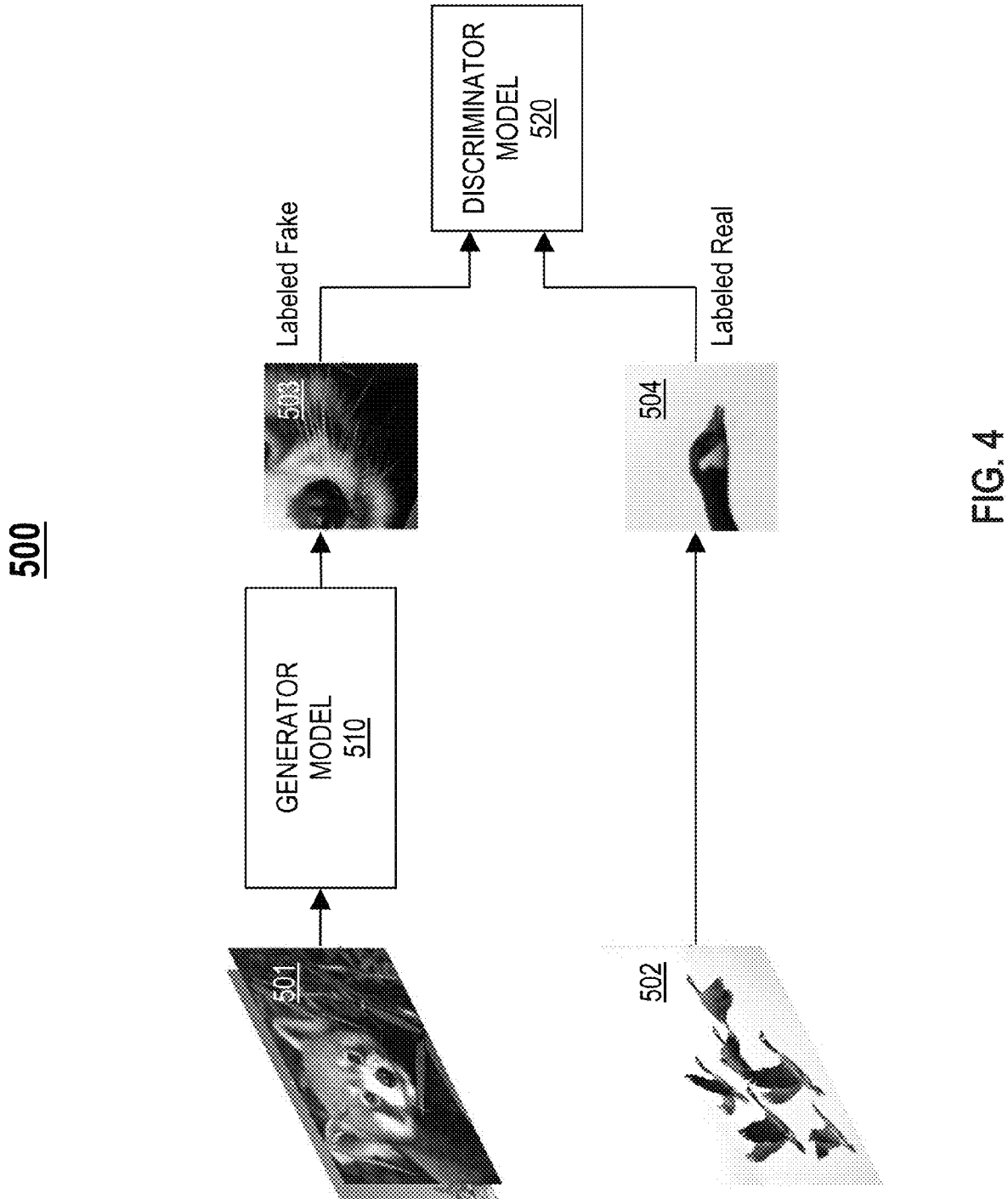
FIG. 4 illustrates an example realistic scale-independent blur kernel Generative Adversarial Network (GAN)-based deep neural network, in one or more embodiments.

In one embodiment, the system 400 comprises a training unit 420 configured to: (1) receive a set of parameters corresponding to the model 450, and (2) perform iterative training to train, based on the set of parameters, the model 450 to estimate a blur kernel of a LR image. In one embodiment, the model 450 resulting from the training is a fully unsupervised GAN-based deep neural network 500 (FIG. 4).

In one embodiment, the system 400 comprises a random crop generating and comparison system 430. During the training, the random crop generating and comparison system 430 is configured to: (1) receive a high quality (i.e., HR)

blur-free image and a low quality (i.e., LR) blurred image, (2) randomly extract image crops from the images received, and (3) compare the image crops using a plurality of loss functions including pixel-wise loss. As described in detail later herein, during the training, the image crops are compared using the loss functions, and the model 450 is optimized to estimate a blur kernel of the low quality blurred image (i.e., level of degradation present in the low quality blurred image) by minimizing losses (calculated using the loss functions) between the image crops. The model 450 is trained to extract/learn a blur distribution similar to a blur distribution of the low quality blurred image.

In one embodiment, the system 400 comprises an updating unit 440. After each iteration of the training, the updating unit 440 is configured to: (1) receive losses calculated using loss functions (e.g., from the random crop generating and comparison system 430), and (2) update, based on the losses, a set of parameters corresponding to the model 450. The initializing unit 410 provides updated values of the set of parameters for use in optimizing the model 450.

In a first iteration of the training, the training unit 420 trains the model 450 based on initial values of the set of parameters (e.g., from the initializing unit 410). In each subsequent iteration of the training, the training unit 420 trains the model 450 based on updated values of the set of parameters (e.g., from the updating unit 440).

In one embodiment, the system 400 comprises a Gaussian kernel estimating system 460. After the training, the Gaussian kernel estimating system 460 is configured to: (1) invoke the model 450 to estimate blur kernels of multiple LR images, and (2) estimate a Gaussian blur standard deviation range of a LR dataset comprising the LR images based on the estimated blur kernels. In one embodiment, the Gaussian kernel estimating system 460 is further configured to generate, based on the Gaussian blur standard deviation range, one or more training samples for training deep convolutional SR neural networks. For example, in one embodiment, the Gaussian kernel estimating system 460 generates, as the one or more training samples, one or more LR-HR training pairs, wherein a blur distribution of the one or more LR-HR training pairs is similar to a blur distribution of a low quality blurred image used during the training (i.e., the one or more LR-HR training pairs have a similar level of degradation distribution as the low quality blurred image). Each of the one or more LR-HR training pairs comprises a LR image (e.g., a SD image) and a corresponding HR image (e.g., a 4K image). Each LR image of the one or more LR-HR training pairs is generated from a same single HR image with a standard deviation randomly selected from the Gaussian blur standard deviation range.

FIG. 2B is a flowchart of an example process 470 implemented by the system 400 of FIG. 2A for realistic scale-independent blur kernel estimation, in one or more embodiments. Process block 471 includes defining parameters (e.g., model, configuration) for a model. Process block 472 includes training, based on the parameters, the model to estimate a realistic scale-independent blur kernel. Process block 473 includes determining whether all iterations of the training have been completed. If all iterations of the training have not been completed, proceed to process block 474. If all iterations of the training have been completed, proceed to process block 477.

Process block 474 includes extracting random crops from a low quality image and a high quality image. Process block 475 includes estimating a blur kernel of the low quality image by comparing the random crops using loss functions including pixel-wise loss. Process block 476 includes updating the parameters for the model based on losses calculated using the loss functions, and returning to process block 472.

Process block 477 includes estimating blur kernels of multiple LR images using the trained model, and estimating a Gaussian blur standard deviation range of a LR dataset comprising the LR images based on the estimated blur kernels.

In one embodiment, process blocks 471-477 may be performed by one or more components of the system 400.

Figure 3:
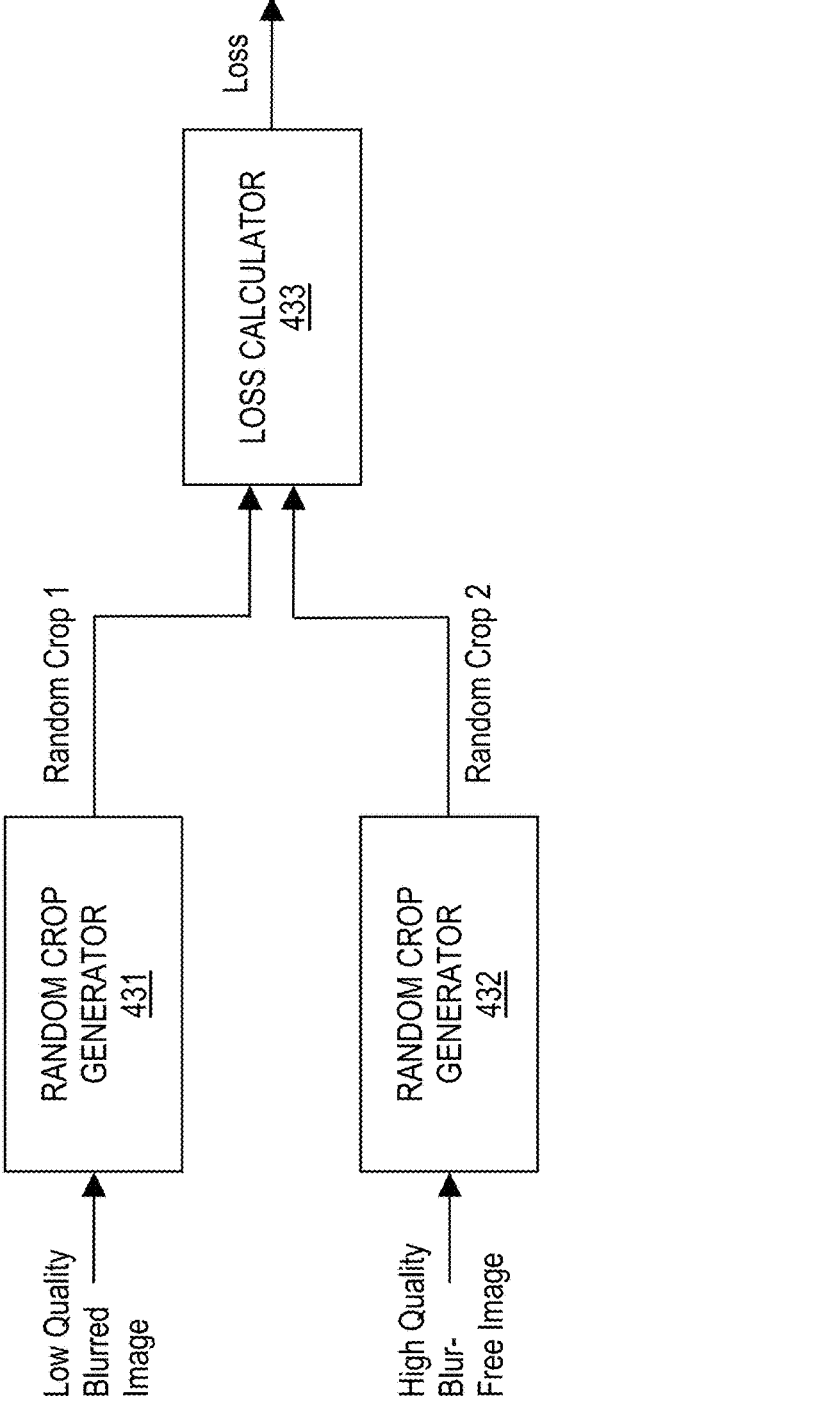
FIG. 3 illustrates an example random crop generating and comparing system, in one or more embodiments.

FIG. 3 illustrates an example random crop generating and comparing system 430, in one or more embodiments. In one embodiment, the random crop generating and comparing system 430 comprises a first random crop generator 431 configured to: (1) receive a low quality (i.e., LR) blurred image, wherein some degradation is present in the low quality blurred image (i.e., the low quality blurred image is not degradation-free), and (2) generate a first image crop comprising a random crop of the low quality blurred image ("Random Crop 1").

In one embodiment, the random crop generating and comparing system 430 comprises a second random crop generator 432 configured to: (1) receive a high quality (i.e., HR) blur-free image, wherein degradation is absent in the high quality blur-free image (i.e., the high quality blur-free image is degradation-free), and (2) generate a second image crop comprising a random crop of the high quality blur-free image ("Random Crop 2").

In one embodiment, the low quality blurred image and the high quality blur-free image are different image resolutions of the same image. In another embodiment, the low quality blurred image and the high quality blur-free image are different image resolutions of different images (i.e., not the same image).

In one embodiment, the random crop generating and comparing system 430 comprises a loss calculator 433 configured to: (1) receive the first image crop comprising the random crop of the low quality blurred image (e.g., Random Crop 1 from the first random crop generator 431), (2) receive the second image crop comprising the random crop of the high quality blur-free image (e.g., Random Crop 2 from the second random crop generator 432), and (3) calculate losses between the first image crop and the second image crop based on a plurality of loss functions including pixel-wise loss. In one embodiment, the losses are calculated by comparing the first image crop and the second image crop using at least four types of loss functions such as, but not limited to, pixel-wise loss, boundary loss, centralized loss, and sparsity loss.

In one embodiment, the random crop generating and comparing system 430 is offline (i.e., off-device). For example, in one embodiment, the random crop generating and comparing system 430 is integrated into, or implemented as part of, the blur kernel estimation system 330 on the remote computing environment 300 for off-device processing.

GAN-based architectures comprise a generator model for generating new data and a discriminator model for classifying whether the new data generated are real or fake. GAN-based architectures are capable of learning blur distributions of images of large image datasets. A generator model of a GAN-based architecture is trained to map a blur distribution of an image taken as source ("source image") to a blur distribution of another image taken as target ("target image"). For example, a GAN-based architecture maps a blur-free source image to a blurred image that is provided as output ("blurred output image"), such that a blur distribution of the blurred output image is similar to a blur distribution of a blurred target image. Conventional solutions that utilize GAN-based architectures, however, are scale-dependent as these solutions require comparing an image against a down-scaled version of the same image (e.g., downscaled by a factor of 2) using a bicubic MSE loss function that is scale-dependent.

FIG. 4 illustrates an example realistic scale-independent blur kernel GAN-based deep neural network 500, in one or more embodiments. In one embodiment, the network 500 comprises a generator model 510 and a discriminator model 520. Each of the generator model 510 and the discriminator model 520 comprises a fully convolutional neural network. During training of the network 500 (e.g., via the training unit 420 and/or the random crop generating and comparing system 430), the network 500 is provided with at least the following inputs: (1) a set of blur-free source images 501, wherein each blur-free source image 501 is degradation-free, and (2) a blurred target image 502, wherein the blurred target image is not degradation-free, and the blurred target image 502 is different from the blur-free source images 501 (i.e., the blurred target image 502 and the blur-free source images 501 are not different image resolutions of the same image). The network 500 resulting from the training is fully unsupervised and scale-independent.

The network 500 compares the set of blur-free source images 501 against the blurred target image 502 to estimate a scale-independent blur kernel. The scale-independent blur kernel may be used to generate a blurred output image from a blur-free source image 501, wherein a blur distribution of the blurred output image is similar to a blur distribution of the blurred target image 502, and a size of the blurred target image 502 is irrespective.

In one embodiment, during training of the network 500 (e.g., via the training unit 420), the generator model 510 is trained to generate a blur-free source image crop 503, wherein the blur-free source image crop 503 comprises a random crop of a blur-free source image 501. The blur-free source image crop 503 is labeled as fake and provided to the discriminator model 520. In one embodiment, a crop size of the blur-free source image crop 503 is 64×64.

A blurred target image crop 504 comprising a random crop of the blurred target image 502 is labeled as real and provided to the discriminator model 520. In one embodiment, the blurred target image crop 504 is a feature-rich crop randomly extracted from the blurred target image 502. In one embodiment, a crop size of the blurred target image crop 504 is 64×64 (i.e., the network 500 extracts feature-rich 64×64 crops from the blurred target image 502).

In one embodiment, during the training of the network 500, the discriminator model 520 learns to output a discriminator map that measures likelihood of a blur distribution extracted from the blur-free source image crop 503 being similar to a blur distribution extracted from the blurred target image crop 504. In one embodiment, the discriminator model 520 calculates a pixel-wise loss as a pixel-wise mean squared error (MSE) difference between the discriminator map and a label map, wherein a portion of the label map corresponding the blurred target image 502 comprises all ones, and another portion of the label map corresponding to a blur-free source image 501 (the blur-free source image crop 503 is randomly cropped from) comprises all zeros.

In one embodiment, the generator model 510 comprises five (5) hidden convolutional layers. Each hidden convolutional layer comprises sixty-four (64) filters. Of the five hidden convolutional layers, the first hidden convolutional layer comprises 7×7 kernels, the second hidden convolutional layer comprises 5×5 kernels, the third hidden convolutional layer comprises 3×3 kernels, the fourth hidden convolutional layer comprises 1×1 kernels, and the fifth hidden convolutional layer comprises 1×1 kernels, such that the receptive field is 13×13. As a result, a scale-independent blur kernel estimated by the network 500 must have a size of at least 13×13. In one embodiment, the size of the scale-independent blur kernel is 17×17. In one embodiment, the network 500 is initialized (e.g., via the initializing unit 410) using a Gaussian filter with a sigma equal to thirteen (13). The network 500 automatically learns to extract a blur distribution from the blur-free source images 501 that is similar to a blur distribution of the blurred target image 502 (i.e., the discriminator 520 is unable to distinguish between the blur-free source image crops 503 and the blurred target image crop 504).

In one embodiment, the network 500 is optimized to estimate a realistic scale-independent blur kernel using a loss function, in accordance with equation (2) provided below:

$$G(I_{inputImg}) = \overset{argminmax}{G \quad D} \left\{ E_{incvops(I_{inputImg})}[|D(I_{blurredTarget}) - 1| + \right.$$

$$\left. |D(G(I_{inputImg}))|] \right\}, \quad (2)$$

wherein G is the generator model 510, D is the discriminator model 520 ("discriminator loss"), $I_{inputimg}$ is a blur-free source image 501, and $I_{blurredTarget}$ is a blurred target image 502.

Once converged in accordance with equation (2) provided above, an estimated realistic scale-independent blur kernel may be used to generate a realistic blurred output image in which a blur distribution of the blurred output image is similar to a blur distribution of the blurred target image. In one embodiment, the estimated realistic scale-independent blur kernel must satisfy a constraint, in accordance with representation (3) provided below:

$$\overset{argmin}{k} \|I_{G(inputimg)} - I_{blurredImg}\|_2 + \left|1 - \sum_{i,j} k_{i,j}\right| + \left|\sum_{i,j} k_{i,j} \cdot m_{i,j}\right| + \sum_{i,j} |k_{i,j}^{0.2}|, \quad (3)$$

wherein a first term $$\overset{argmin}{k} \|I_{G(inputimg)} - I_{blurredImg}\|_2$$

of the constraint is a pixel-wise MSE, the second term $$\left|1 - \sum_{i,j} k_{i,j}\right|$$

of the constraint is a boundary loss, the third term $$\left|\sum_{i,j} k_{i,j} \cdot m_{i,j}\right|$$

of the constraint is a centralized loss, and the fourth term $$\sum_{i,j} |k_{i,j}^{0.2}|$$

of the constraint is a sparsity loss. The first term of the constraint ensures a blur distribution of the blurred output image is similar to a blur distribution of the blurred target image. The second term of the constraint ensures the estimated realistic scale-independent blur kernel is normalized. The third term of the constraint ensures non-zero values to boundaries are penalized. The fourth term of the constraint ensures sparsity. Unlike conventional solutions that utilize a bicubic MSE loss function that is scale-dependent, the network 500 utilizes a MSE loss function.

FIG. 5 illustrates different image crops used during the training of the realistic scale-independent blur kernel GAN-based deep neural network 500, in one or more embodiments. In one embodiment, during training of the network 500 (e.g., via the training unit 420), a blur-free source image crop 503 (e.g., a 64×64 crop) is randomly extracted from a blur-free source image 501 (FIG. 3), a blurred target image crop 504 (e.g., a 64×64 crop) is randomly extracted from a blurred target image 502 (FIG. 3), and the network 500 is optimized to extract/learn a blur distribution similar to a blur distribution of the blurred target image 502 by minimizing losses (calculated using loss functions) between the blur-free source image crop 503 and the blurred target image crop 504.

FIG. 6A illustrates a visual comparison between a blurred target image 502 and a blurred output image 505 generated by the realistic scale-independent blur kernel GAN-based deep neural network 500, in one or more embodiments. In one embodiment, a realistic scale-independent blur kernel estimated by the network 500 is used to generate a blurred output image 505, wherein a blur distribution of the blurred output image 505 is similar to a blur distribution of a blurred target image 502, and a size of the blurred output image 505 is the same as an original size of the blurred target image 502.

Visually, the blurred target image 502 and the blurred output image 505 are very similar when compared quantitatively (e.g., using peak signal to noise ratio (PSNR) and/or structural similarity index measure (SSIM)). For example, the PSNR is large (e.g., equal to 46.6).

FIG. 6B illustrates a visual comparison between a blurred target image 502 and a blurred output image 506 generated by a conventional GAN-based architecture. Visually, the blurred output image 506 appears blurrier than the blurred target image 502. A blur distribution of the blurred output image 506 is not similar to a blur distribution of the blurred target image 502. For example, unlike the PSNR between the blurred target image 502 and the blurred output image 505 generated by the network 500, the PSNR between the blurred target image 502 and the blurred output image 506 generated by the conventional GAN-based architecture is smaller (e.g., equal to 31.2).

FIG. 7 illustrates a visual comparison between a blurred target image crop 504 randomly extracted from a blurred target image 502 and a blurred output image 505 generated by the realistic scale-independent blur kernel GAN-based deep neural network 500, in one or more embodiments. In one embodiment, a realistic scale-independent blur kernel estimated by the network 500 is used to generate a blurred output image 505, wherein a blur distribution of the blurred output image 505 is similar to a blur distribution of a blurred target image 502.

Visually, a blurred target image crop 504 of the blurred target image 502 and the blurred output image 505 are very similar when compared quantitatively (e.g., using peak signal to noise ratio (PSNR) and/or structural similarity index measure (SSIM)).

Figure 8:
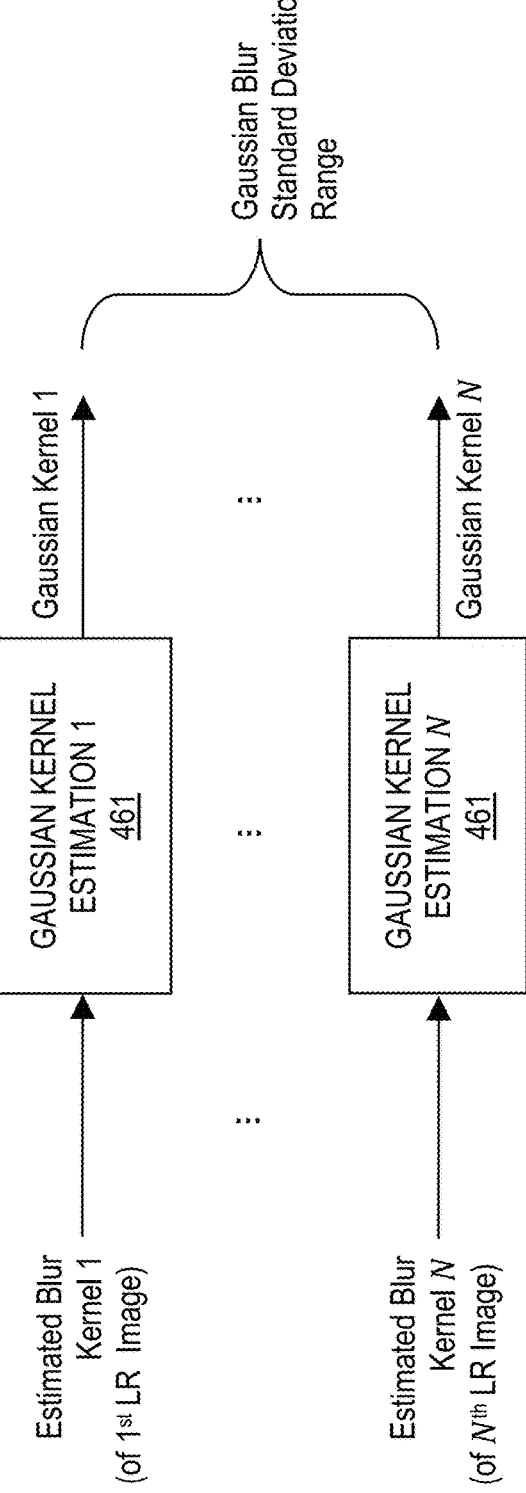
FIG. 8 illustrates an example Gaussian kernel estimating system, in one or more embodiments.

FIG. 8 illustrates an example Gaussian kernel estimating system 460, in one or more embodiments. In one embodiment, the Gaussian kernel estimating system 460 a comprises N Gaussian kernel estimation units 461. Let i generally denote a positive integer, wherein i∈N. For each LR image i, a corresponding Gaussian kernel estimation unit 461 is configured to: (1) receive an estimated realistic scale-independent blur kernel i of the LR image i from the model 450, and (2) estimate a Gaussian kernel i of the LR image i. The Gaussian kernel estimating system 460 is configured to estimate a Gaussian blur standard deviation range (e.g., [0-0.6]) of a LR dataset comprising N LR images based on N estimated blur kernels from the N Gaussian kernel estimation units 461.

Deep convolutional SR neural networks require many training samples. In one embodiment, the Gaussian kernel estimating system 460 is further configured to generate, based on the Gaussian blur standard deviation range, one or more training samples for improving speed of training deep convolutional SR neural networks. For example, in one embodiment, the Gaussian kernel estimating system 460 generates, as the one or more training samples, one or more LR-HR training pairs, wherein a blur distribution of the one or more LR-HR training pairs is similar to a blur distribution of a low quality blurred image used during the training (i.e., the one or more LR-HR training pairs have a similar level of degradation distribution as the low quality blurred image). Each of the one or more LR-HR training pairs comprises a LR image (e.g., a SD image) and a corresponding HR image (e.g., a 4K image). Each LR image of the one or more LR-HR training pairs is generated from a same single HR image with a standard deviation randomly selected from the Gaussian blur standard deviation range.

In one embodiment, the Gaussian kernel estimating system 460 generates LR images from the same single HR image for improving speed of training of deep convolutional SR neural networks, wherein the LR images correspond to a Gaussian blur standard deviation randomly selected from the Gaussian blur standard deviation range.

For example, if the Gaussian blur standard deviation range is [0-0.6], the Gaussian kernel estimating system 460 generates LR images from the same single HR image, wherein the LR images correspond to blur factors randomly selected from the range, such as 0.1, 0.2, 0.3, and 0.33.

FIG. 9 is a flowchart of an example process 600 for realistic, scale-independent blur kernel estimation, in one or more embodiments. Process block 601 includes generating a first image crop and a second image crop randomly extracted from a low-quality image and a high-quality image, respectively. Process block 602 includes comparing the first image crop and the second image crop using a plurality of loss functions including pixel-wise loss to calculate losses. Process block 603 includes optimizing a model trained to estimate a realistic scale-independent blur kernel of a low-resolution (LR) blurred image by minimizing the losses.

In one embodiment, process blocks 601-603 may be performed by one or more components of the blur kernel estimation system 400.

Figure 10:
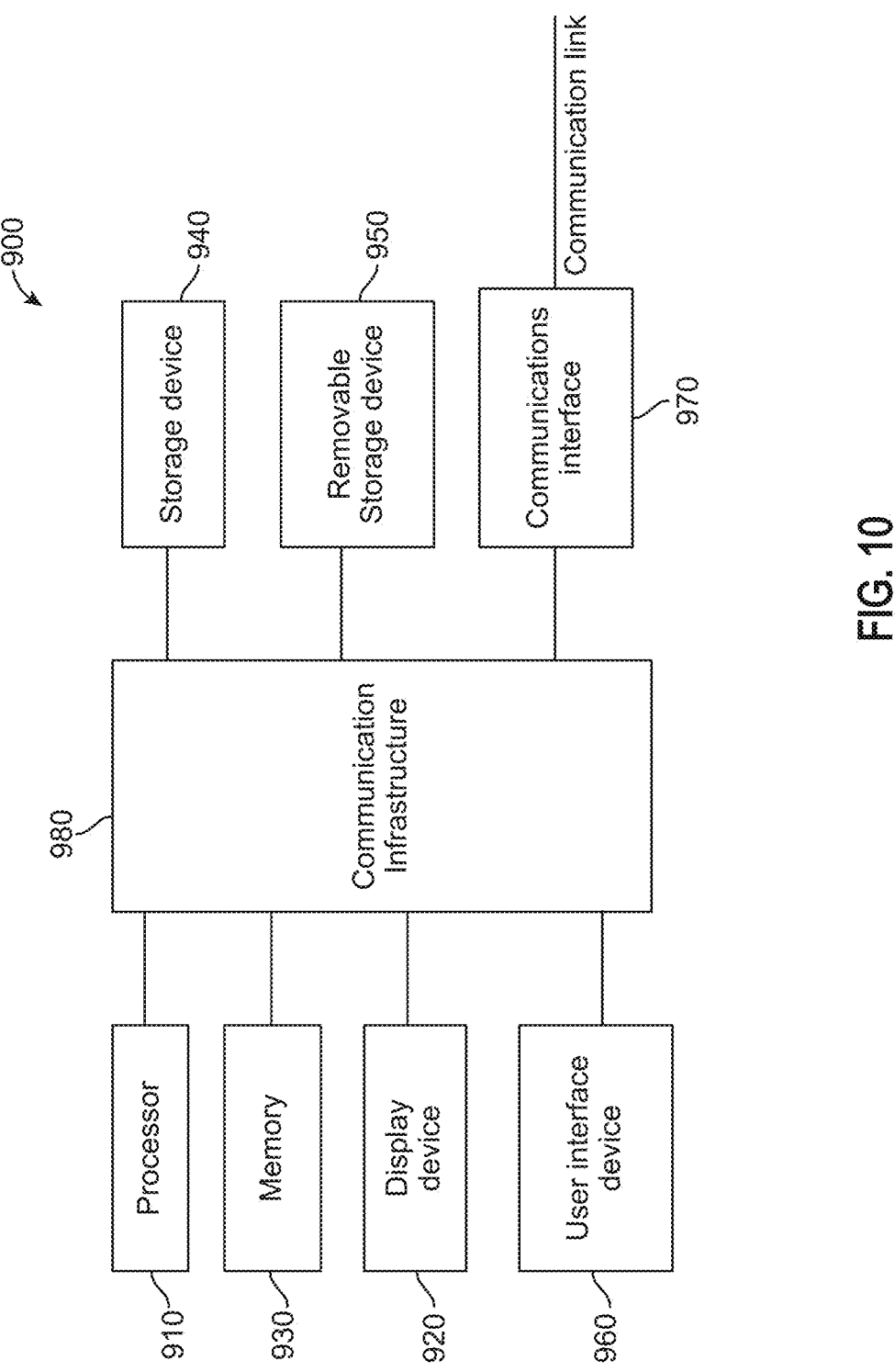
FIG. 10 is a high-level block diagram showing an information processing system comprising a computer system useful for implementing the disclosed embodiments.

FIG. 10 is a high-level block diagram showing an information processing system comprising a computer system 900 useful for implementing the disclosed embodiments.

The systems 200 and/or 400 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 600 (FIG. 9) and/or process 470 (FIG. 2B) may be stored as program instructions on the memory 930, storage device 940, and/or the removable storage device 950 for execution by the one or more processors 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium", "computer usable medium", "computer readable medium", and "computer program product" are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:

generating a first image crop comprising a first crop of a low-quality image that is randomly extracted from the low-quality image;

generating a second image crop comprising a second crop of a high-quality image that is randomly extracted from the high-quality image, wherein the low-quality image and the high-quality image are different images having different image resolutions;

comparing the first image crop and the second image crop using a plurality of loss functions including pixel-wise loss to calculate losses between the first image crop and the second image crop;

optimizing a model by minimizing the losses between the first image crop and the second image crop; and estimating, utilizing the optimized model, a realistic scale-independent blur kernel of the low-quality image without different scaled versions of the low-quality image.

2. The method of claim 1, further comprising:

mapping, using the optimized model, a high-resolution (HR) blur-free image to a blurred output image, wherein the blurred output image has a blur distribution that is similar to the low-quality image.

3. The method of claim 1, wherein the low-quality image is a low-resolution (LR) blurred image, and the high-quality image is a high-resolution (HR) blur-free image.

4. The method of claim 3, further comprising:

estimating blur kernels of a plurality of LR blurred images using the optimized model; and estimating a range of standard deviation for Gaussian blur present in the plurality of LR blurred images based on the estimated blur kernels.

5. The method of claim 4, further comprising:

generating one or more LR images from a same single high-resolution (HR) image based on a standard deviation randomly selected from the range of standard deviation for Gaussian blur.

6. The method of claim 5, further comprising:

generating one or more training pairs for training a deep convolutional super-resolution network, wherein each of the one or more training pairs comprises a LR image and a corresponding HR image, and at least one LR image of the one or more training pairs is included in the one or more LR images.

7. The method of claim 1, wherein the plurality of loss functions further include boundary loss, centralized loss, and sparsity loss.

8. A system comprising:

at least one processor; and a non-transitory processor-readable memory device storing instructions that when executed by the at least one processor causes the at least one processor to perform operations including:

generating a first image crop comprising a first crop of a low-quality image that is randomly extracted from the low-quality image;

generating a second image crop comprising a second crop of a high-quality image that is randomly extracted from the high-quality image, wherein the low-quality image and the high-quality image are different images having different image resolutions;

comparing the first image crop and the second image crop using a plurality of loss functions including pixel-wise loss to calculate losses between the first image crop and the second image crop;

optimizing a model by minimizing the losses between the first image crop and the second image crop; and estimating, utilizing the optimized model, a realistic scale-independent blur kernel of the low-quality image without different scaled versions of the low-quality image.

9. The system of claim 8, wherein the operations further include:

mapping, using the optimized model, a high-resolution (HR) blur-free image to a blurred output image, wherein the blurred output image has a blur distribution that is similar to the low-quality image.

10. The system of claim 8, wherein the low-quality image is a low-resolution (LR) blurred image, and the high-quality image is a high-resolution (HR) blur-free image.

11. The system of claim 10, wherein the operations further include:

estimating blur kernels of a plurality of LR blurred images using the optimized model; and estimating a range of standard deviation for Gaussian blur present in the plurality of LR blurred images based on the estimated blur kernels.

12. The system of claim 11, wherein the operations further include:

generating one or more LR images from a same single high-resolution (HR) image based on a standard deviation randomly selected from the range of standard deviation for Gaussian blur.

13. The system of claim 12, wherein the operations further include:

generating one or more training pairs for training a deep convolutional super-resolution network, wherein each of the one or more training pairs comprises a LR image and a corresponding HR image, and at least one LR image of the one or more training pairs is included in the one or more LR images.

14. The system of claim 8, wherein the plurality of loss functions further include boundary loss, centralized loss, and sparsity loss.

15. A non-transitory processor-readable medium that includes a program that when executed by a processor performs a method comprising:

generating a first image crop comprising a first crop of a low-quality image that is randomly extracted from the low-quality image;

generating a second image crop comprising a second crop of a high-quality image that is randomly extracted from the high-quality image, wherein the low-quality image and the high-quality image are different images having different image resolutions;

comparing the first image crop and the second image crop using a plurality of loss functions including pixel-wise loss to calculate losses between the first image crop and the second image crop;

optimizing a model by minimizing the losses between the first image crop and the second image crop; and estimating, utilizing the optimized model, a realistic scale-independent blur kernel of the low-quality image without different scaled versions of the low-quality image.

16. The non-transitory processor-readable medium of claim 15, wherein the method further comprises:

mapping, using the optimized model, a high-resolution (HR) blur-free image to a blurred output image, wherein the blurred output image has a blur distribution that is similar to the low-quality image.

17. The non-transitory processor-readable medium of claim 15, wherein the low-quality image is a low-resolution (LR) blurred image, and the high-quality image is a high-resolution (HR) blur-free image.

18. The non-transitory processor-readable medium of claim 17, wherein the method further comprises:

estimating blur kernels of a plurality of LR blurred images using the optimized model; and estimating a range of standard deviation for Gaussian blur present in the plurality of LR blurred images based on the estimated blur kernels.

19. The non-transitory processor-readable medium of claim 18, wherein the method further comprises:

generating one or more LR images from a same single high-resolution (HR) image based on a standard deviation randomly selected from the range of standard deviation for Gaussian blur.

20. The non-transitory processor-readable medium of claim 19, wherein the method further comprises:

generating one or more training pairs for training a deep convolutional super-resolution network, wherein each of the one or more training pairs comprises a LR image and a corresponding HR image, and at least one LR image of the one or more training pairs is included in the one or more LR images.

* * * * *